United States Patent
Wang et al.

(10) Patent No.: US 7,637,632 B2
(45) Date of Patent: Dec. 29, 2009

(54) HOUSING OF PROJECTION APPARATUS

(75) Inventors: Cheng Wang, Chu-Nan (TW); Tsung-Ching Lin, Chu-Nan (TW)

(73) Assignee: Coretronic Corporation, Miao-Li County (TW)

( * ) Notice: Subject to any disclaimer, the term of this patent is extended or adjusted under 35 U.S.C. 154(b) by 86 days.

(21) Appl. No.: 11/436,840

(22) Filed: May 17, 2006

(65) Prior Publication Data

US 2006/0268517 A1 Nov. 30, 2006

(30) Foreign Application Priority Data

May 27, 2005 (TW) ............... 94117397 A (51) Int. Cl.
*F21V 29/00* (2006.01)
(52) U.S. Cl. ............... 362/294; 362/310; 362/362; 362/373; 362/296; 165/80.3; 361/695
(58) Field of Classification Search ............ 362/294, 362/373, 362, 310, 296; 361/695; 165/80.3
See application file for complete search history.

(56) References Cited

U.S. PATENT DOCUMENTS

| | | | |
|---|---|---|---|
| 6,693,381 B2* | 2/2004 | Bell et al. | 353/60 |
| 6,966,653 B2* | 11/2005 | Kitabayashi | 353/60 |
| 2002/0109994 A1* | 8/2002 | Liang et al. | 362/373 |
| 2004/0032739 A1* | 2/2004 | Johanson | 362/304 |
| 2004/0145896 A1* | 7/2004 | Watanabe et al. | 362/294 |
| 2004/0170017 A1* | 9/2004 | Zhan et al. | 362/240 |
| 2006/0120083 A1* | 6/2006 | Trojanowski et al. | 362/294 |

FOREIGN PATENT DOCUMENTS

TW 479152 3/2002

* cited by examiner

*Primary Examiner*—Sandra L O'Shea
*Assistant Examiner*—Jessica L McMillan
(74) *Attorney, Agent, or Firm*—J.C. Patents (57) ABSTRACT

A housing of a projection apparatus suitable for accommodating a heat source is provided. The housing includes an outer casing and a heat conductive element. The outer casing has an inner wall. Furthermore, the outer casing is suitable for enclosing the heat source. The heat conductive element is disposed on the inner wall between the outer casing and the heat source. Moreover, an insulated chamber is formed between the heat conductive element and the outer casing. The insulated chamber prevents the heat source from directly heating the outer casing and provides a better heat insulation.

11 Claims, 10 Drawing Sheets

HOUSING OF PROJECTION APPARATUS

CROSS-REFERENCE TO RELATED APPLICATION

This application claims the priority benefit of Taiwan application serial no. 94117397, filed on May 27, 2005. All disclosure of the Taiwan application is incorporated herein by reference.

BACKGROUND OF THE INVENTION

1. Field of the Invention

The present invention relates to a housing. More particularly, the present invention relates to a housing of a projection apparatus.

2. Description of the Related Art

With the rapid progress in opto-electric and projection technologies, wide screen projection apparatus having high display quality and high resolution are in great demand. To achieve a higher display quality and provide a high brightness, a high-power light source is often required. When a high-power light source is used in a projection apparatus, more heat is produced. Thus, the interior of the projection apparatus as well as the housing may be over-heated. To prevent the housing of the projection apparatus from overheating, the housing must be properly insulated so that the housing is maintained at a moderate temperature throughout the operational period.

Figure 1:
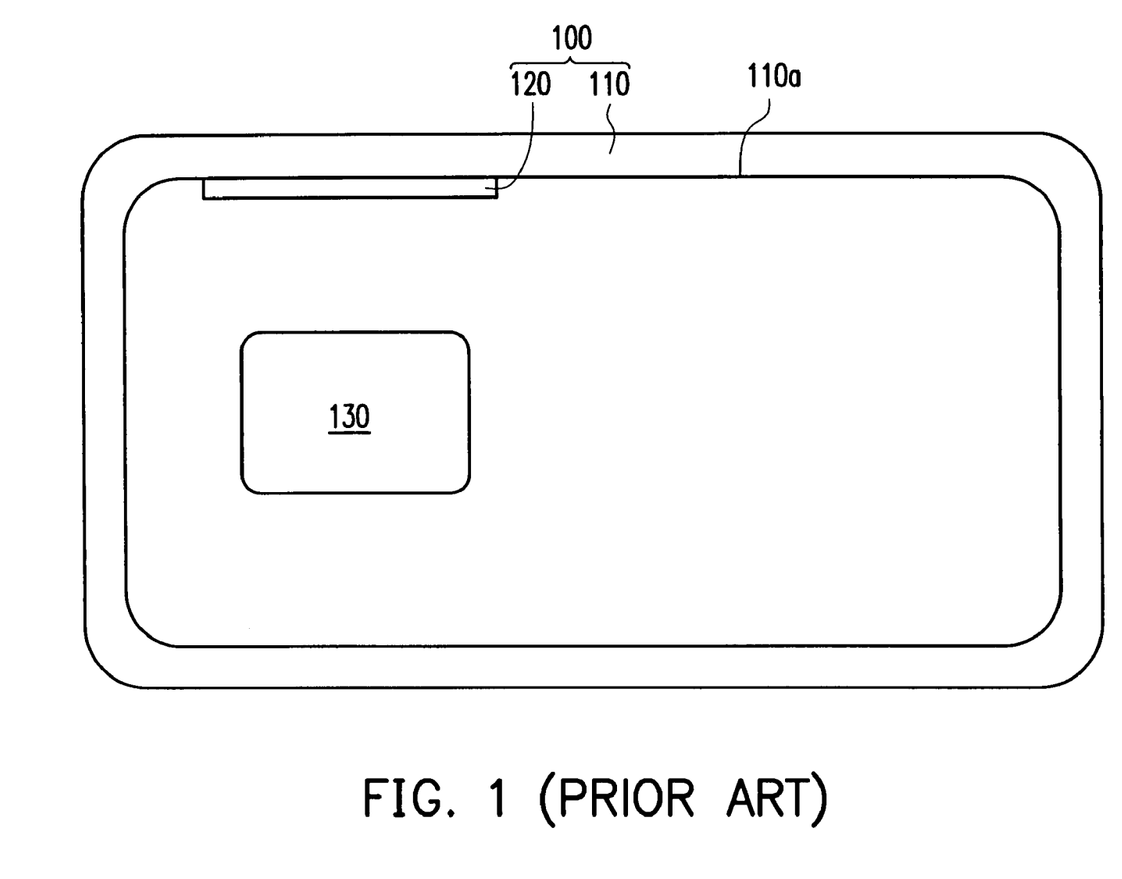
FIG. 1 is a diagram of a conventional housing for a projection apparatus enclosing a light source.

FIG. 1 is a diagram of a conventional housing for a projection apparatus. As shown in FIG. 1, the housing 100 includes an outer casing 110 and a beat conductive element 120. The heat conductive element 120 is made of a highly conductive material such as aluminum or copper. The heat conductive element 120 is disposed on an inner wall 110a of the outer casing 110 and reflects light from a light source 130 so as to prevent the light source 130 from directly illuminating on the inner wall 110a of the outer casing 110 that may cause overheat of the outer casing 110. Furthermore, due to a better thermal conductivity of the heat conductive element 120, the outer casing 110 is evenly heated. Nevertheless, due to direct contact, part of the heat absorbed by the heat conductive element 120 is conducted to the outer casing 110, which still results in an increase of the temperature of the outer casing 110.

Figure 2:
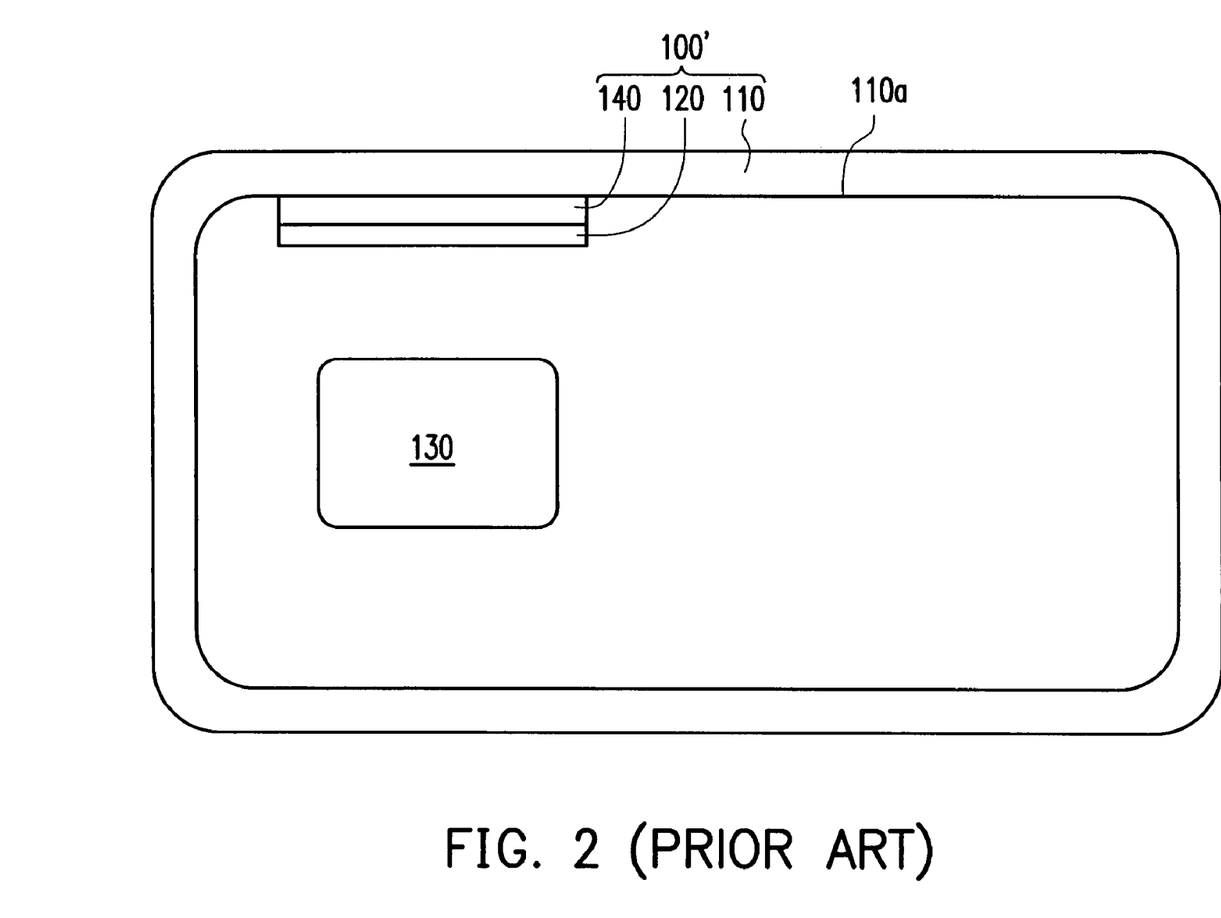
FIG. 2 is a diagram of another conventional housing for a projection apparatus enclosing a light source.

FIG. 2 is a diagram of another conventional housing for a projection apparatus. As shown in FIG. 2, the housing 100' includes an outer casing 110, a heat conductive element 120 and a layer of foam 140. The main difference of this design from the housing illustrated in FIG. 1 is that the layer of foam 140 (having a thermal conductivity k=6.06×10$^{-2}$ W/m*K) is disposed between the outer casing 110 and the heat conductive layer 120 of the housing 100'. The layer of foam 140 is an insulating layer that prevents the conduction of heat from the heat conductive element 120 to the outer casing 110. Although the layer of foam 140 with a lower thermal conductivity can reduce the amount of heat conducted to the outer casing 110, the heat-insulating performance of the layer of foam 140 is still quite limited. Furthermore, the layer of foam 140 is expensive, and manufacturing a thin layer of foam with high quality is difficult. Moreover, the thickness of the layer of foam 140 has to be increased if a better insulating effect is desired. However, increasing the thickness of the layer of foam 140 also increases system impedance and assembling instability.

Aside from the aforementioned thermal insulating designs, heat-dissipating techniques are often deployed to prevent over-heating of the housing. For example, an air flow is forced through a gap between the light source and the outer casing to cool down the outer casing and lower the casing temperature. However, if the gap between the light source and the outer casing is too narrow or there is too much obstruction to the air flow, the cooling effect on the outer casing will be significantly compromised. Furthermore, the cooling air for cooling the outer casing may be preheated by some other heat-emitting elements inside the housing, thereby limiting the ultimate cooling effect.

SUMMARY OF THE INVENTION

The present invention is directed to provide a housing for a projection apparatus that has a better thermal insulating effect.

As embodied and broadly described herein, the invention provides a housing including an outer casing and a heat conductive element. The outer casing has an inner wall. Furthermore, the outer casing is suitable for enclosing a heat source. The heat conductive element is disposed on the inner wall between the outer casing and the heat source. Moreover, an insulated chamber is formed between the heat conductive element and the outer casing.

According to one embodiment of the present invention, the housing is a casing of a projection apparatus, for example. The housing may further include a layer of adhesive that adheres between the outer casing and the heat conductive element. The outer casing has a first groove and the heat conductive element covers the first groove to form the insulated chamber mentioned above. In addition, the outer casing also includes a plurality of first protrusions inside the first groove. The first protrusions are connected to the heat conductive element. The height of the first protrusions may be identical to the depth of the first groove, for example. In one preferred embodiment, the height of the first protrusions is between 1 millimeter to 7 millimeter. The heat source is a light source, for example. The heat conductive element has a reflector surface capable of reflecting most of the light emitted from the light source. In addition, the reflector in the present embodiment has a reflective surface or a scattering surface facing the heat source, for example. In another embodiment of the present invention, the heat conductive element may have a second groove and the outer casing covers the second groove to form the insulated chamber. The heat conductive element further includes a plurality of second protrusions inside the second groove. The second protrusions are connected to the outer casing. Furthermore, the height of the second protrusions is identical to the depth of the second groove, for example. In one preferred embodiment, the height of the second protruding sots is between 1 millimeter to 7 millimeter. The insulated chamber in the housing is a sealed chamber, for example. Moreover, the insulated chamber contains an insulating gas, for example. The insulating gas includes a gas that has a thermal conductivity lower than foam, air, or other injected gas. However, the insulated chamber can also be a vacuum chamber. In brief, the present invention utilizes the insulated chamber formed between the outer casing and the heat conductive element to prevent the heat source from directly heating the outer casing. Hence, the present invention does not need to use foam to obtain a better insulating effect.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
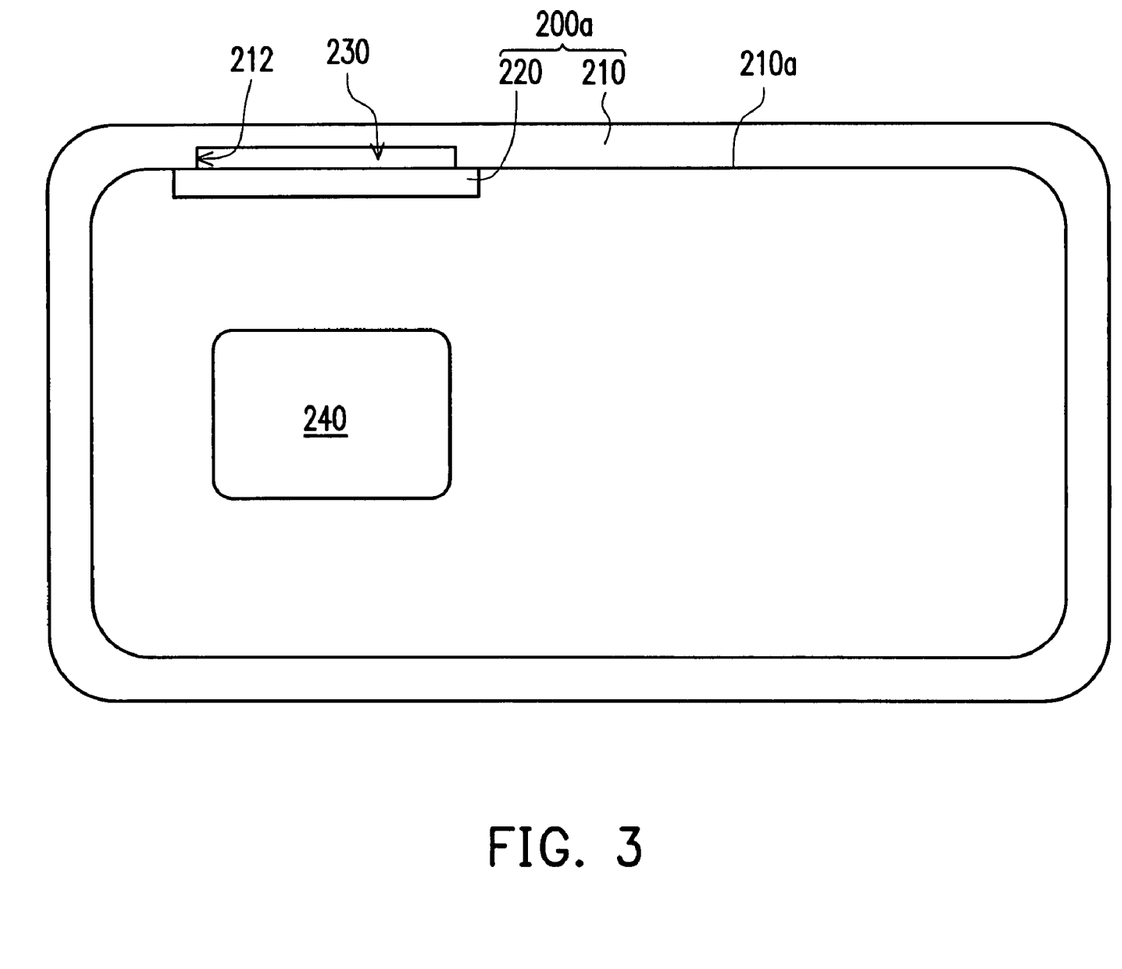
FIGS. 3, 4 and 5 are diagrams of housing configurations for a projection apparatus enclosing a heat source according to a first embodiment of the present invention.
Figure 4:
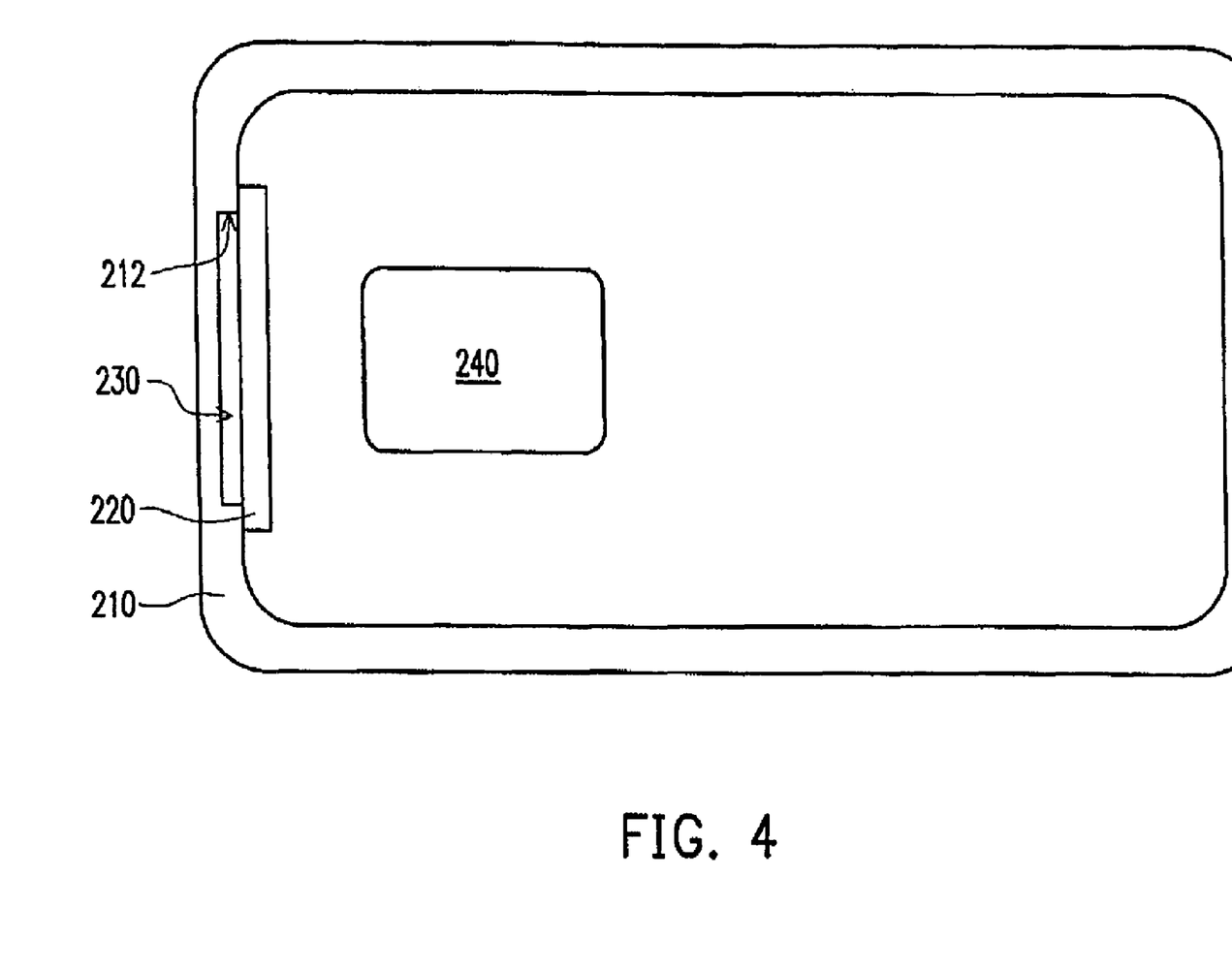
Figure 5:
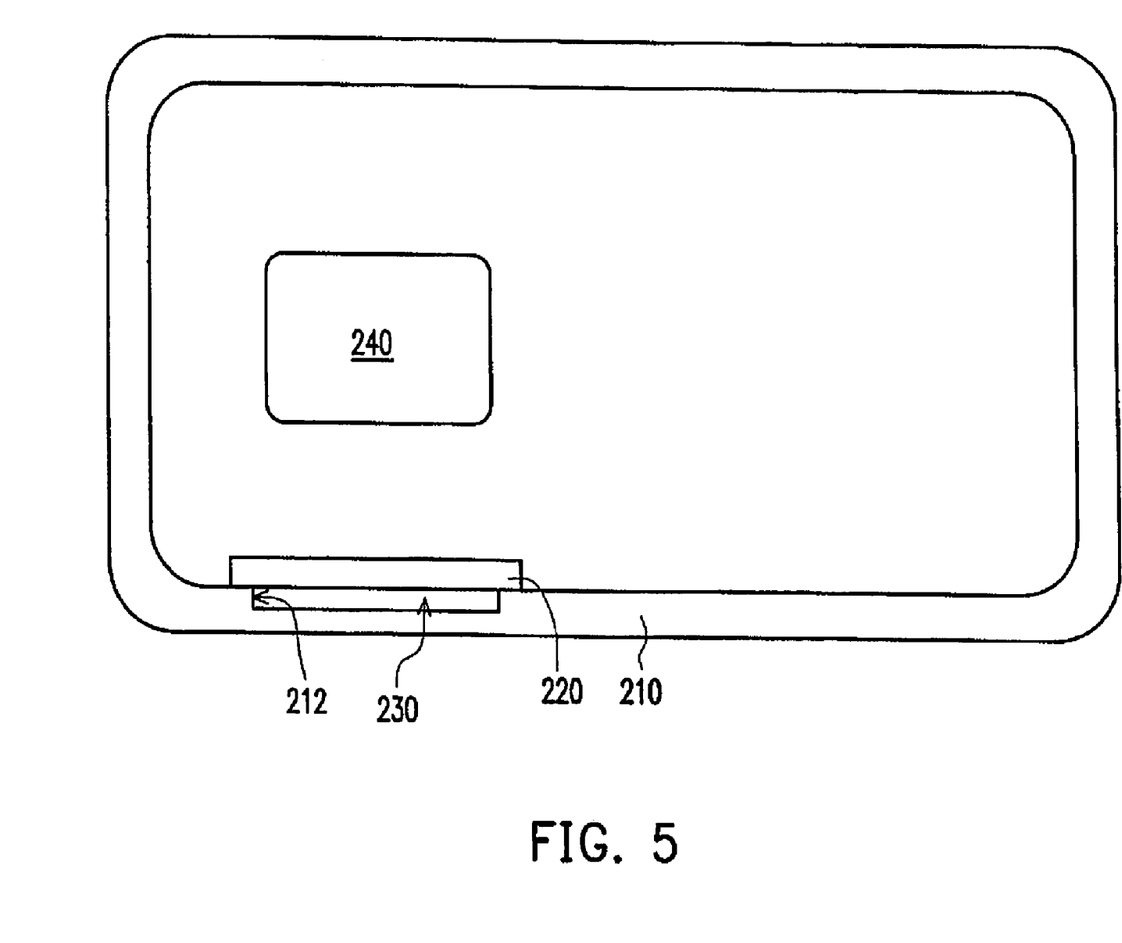

FIGS. 3, 4 and 5 are diagrams of housing configurations for a projection apparatus according to a first embodiment of the present invention. As shown in FIG. 3, the housing 200a of the present embodiment is suitable for enclosing a heat source 240. Furthermore, the housing 200a includes an outer casing 210 and a heat conductive element 220. The outer casing 210 has an inner wall 210a and the outer casing 210 encloses the heat source 240. Taking a common projection apparatus as an example, the internal heat source 240 is a light source of the projection apparatus or other heat-producing element. The heat conductive element 220 is disposed on the inner wall 210a between the outer casing 210 and the heat source 240. In the present embodiment, the heat conductive element 220 is a metallic plate having a high light reflectivity and good heat resistance, for example.

As shown in FIGS. 3, 4 and 5, an insulated chamber 230 is formed between the heat conductive element 220 and the outer casing 210. The insulated chamber 230 is located above the heat source 240 (shown in FIG. 3), on the left side of the heat source 240 (shown in FIG. 4) or under the heat source 240 (shown in FIG. 5). Obviously, the present invention also permits any suitable variation of the position of the insulated chamber 230.

Figure 6:
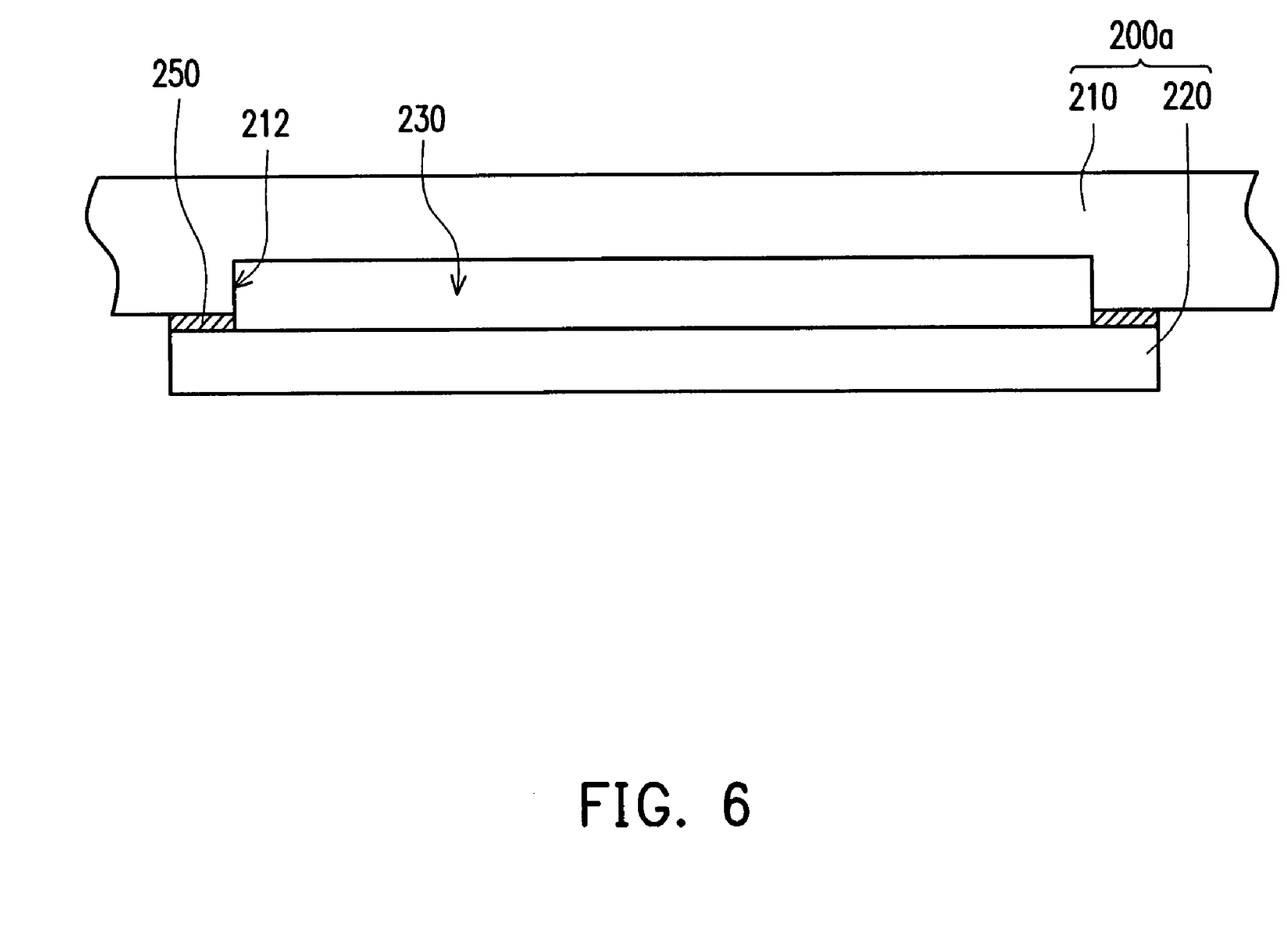
FIG. 6 is a partially magnified view of the housing in FIG. 3.

FIG. 6 is a partially magnified view of the housing in FIG. 3. As shown in FIG. 6, the housing 200a may further include a layer of adhesive 250. Furthermore, the outer casing 210 is adhered to the heat conductive element 220 through the adhesive 250. In one embodiment, the adhesive 250 can be a heat-resistant material to maintain proper adhesion as the adhesive 250 is subjected to the heat from the heat source 240.

As shown in FIG. 6, the outer casing 210 has a first groove 212 and the heat conductive element 220 covers the first groove 212 of the outer casing 210 to form the insulated chamber 230. When the projection apparatus is in operation, the internal heat source 240 will gradually heat up the housing 200a. The heat conductive element 220 serves to dissipate the heat from the heat source 240 and the insulated chamber 230 serves to reduce the amount of heat conducted from the heat conductive element 220 to the outer casing 210. In other words, the insulated chamber 230 prevents the outer casing 210 from being directly heated by the heat source 240.

Figure 7:
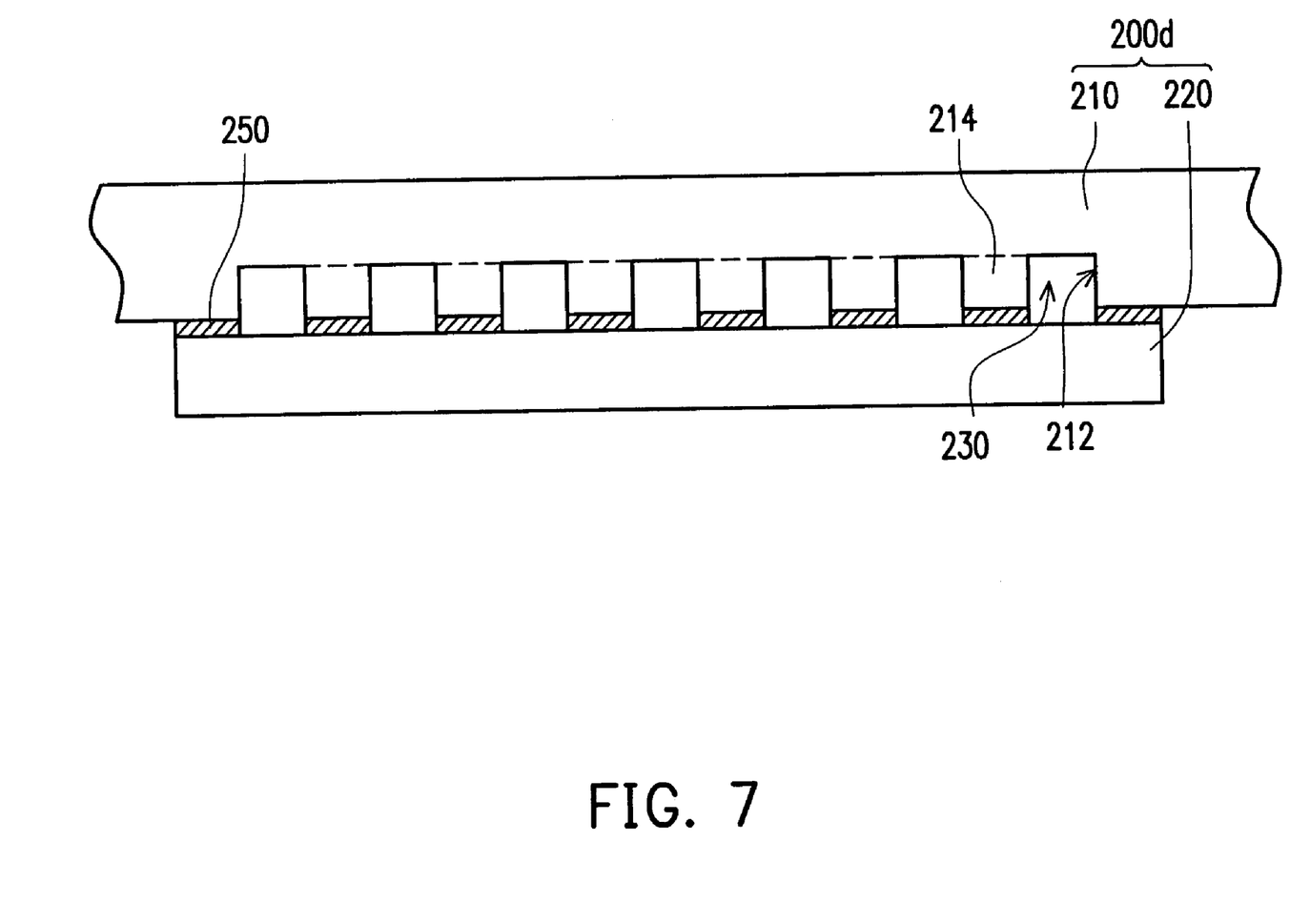
FIG. 7 is a partially magnified view of a housing according to a second embodiment of the present invention.

FIG. 7 is a partially magnified view of a housing according to a second embodiment of the present invention. The housing 200d of the present embodiment is similar to the housing 200a disclosed in the first embodiment. Aside from an outer casing 210 and a heat conductive element 220, the housing 200d in the present embodiment further includes a plurality of first protrusions 214. Specifically, the outer casing 210 has a first groove 212 and a plurality of first protrusions 214 inside the first groove 212. These first protrusions 214 are arranged in a matrix inside the first groove 212, for example. In the present embodiment, the first protrusions 214 connect with the heat conductive element 220 through the adhesive 250, for example. In addition, the adhesive 250 can be a heat-resistant material to maintain proper adhesion even when heated by the heat source 240.

Further referring to FIG. 7, a plurality of protrusions is disposed inside the first groove 212. Therefore, after the outer casing 210 and the heat conductive element 220 are connected together to form the insulated chamber 230, the first protrusions 214 are distributed inside the insulated chamber 230. In the present embodiment, the height of the first protrusions 214 is identical to the depth of the first groove 212 so that the first protrusions can maintain direct contact or indirect contact through the adhesive 250 with the heat conductive element 220. As the first protrusions 214 are connected to the heat conductive element 220 directly or indirectly through the adhesive 250, the contact area between the outer casing 210 and the heat conductive element 220 is increased and the depth of the insulated chamber can be effectively maintained.

In one preferred embodiment, the length, width and height of the first protrusions 214 are set between 1 millimeter to 7 millimeter. In detail, the first protrusions 214 have a cubical or rectangular block structure with a length, width and height set between 1 millimeter to 7 millimeter.

Figure 8:
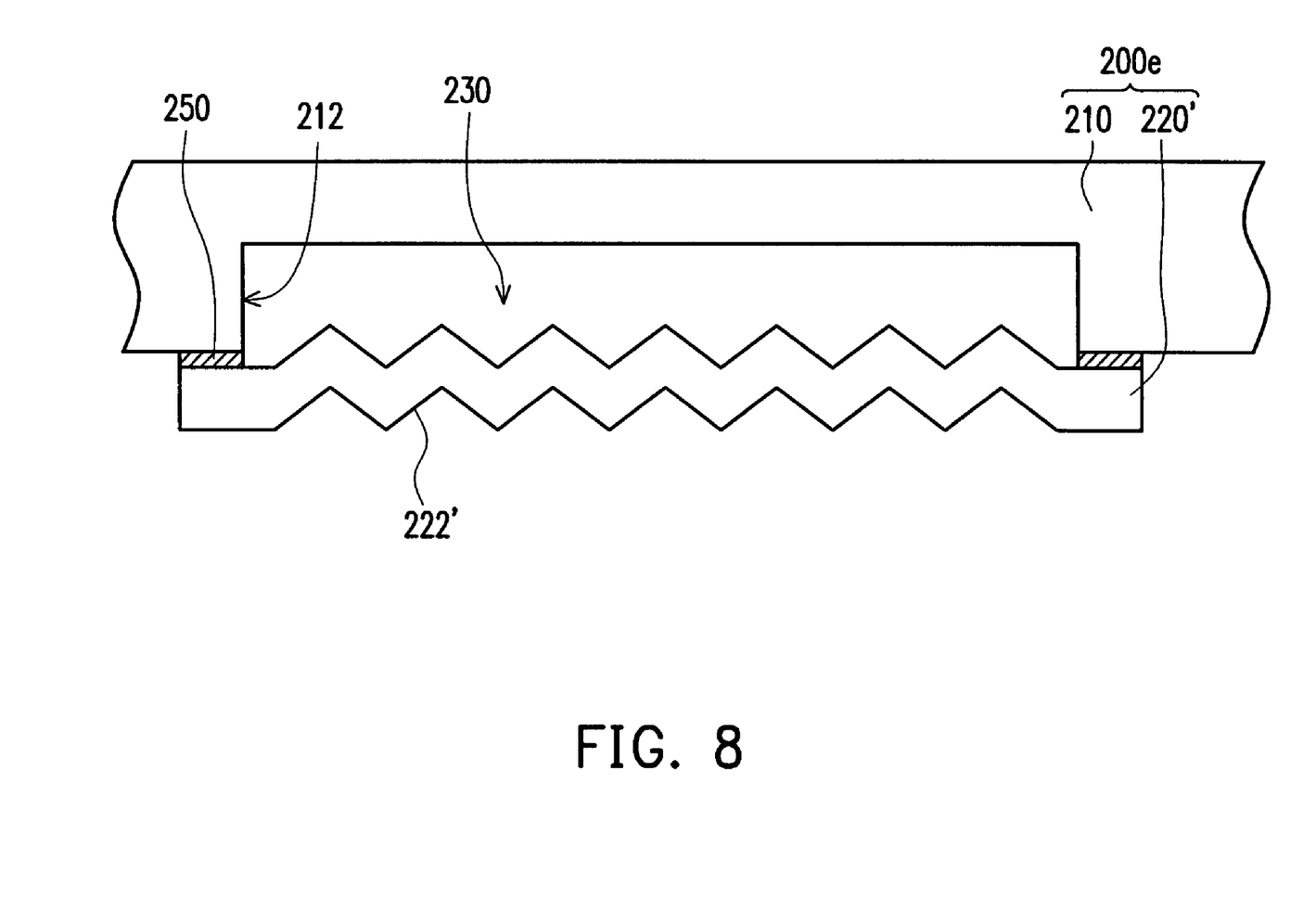
FIG. 8 is a partially magnified view of a housing according to a third embodiment of the present invention.

FIG. 8 is a partially magnified view of a housing according to a third embodiment of the present invention. The housing 200e of the present embodiment is very similar to the housing 200a disclosed in the first embodiment. However, instead of using a metallic plate having a flat reflecting surface as the heat conductive element 220 in the first embodiment, the housing 200e of the present invention uses a specially fabricated heat conductive element 220'. The heat conductive element 220' is a metallic plate with a high reflectivity and a saw-tooth profile. Furthermore, one saw-tooth surface 222' is both a reflecting and a scattering surface facing the heat source 240 so that the heat from the light source can be dispersed and the light from the light source can be reflected or scattered.

Figure 9:
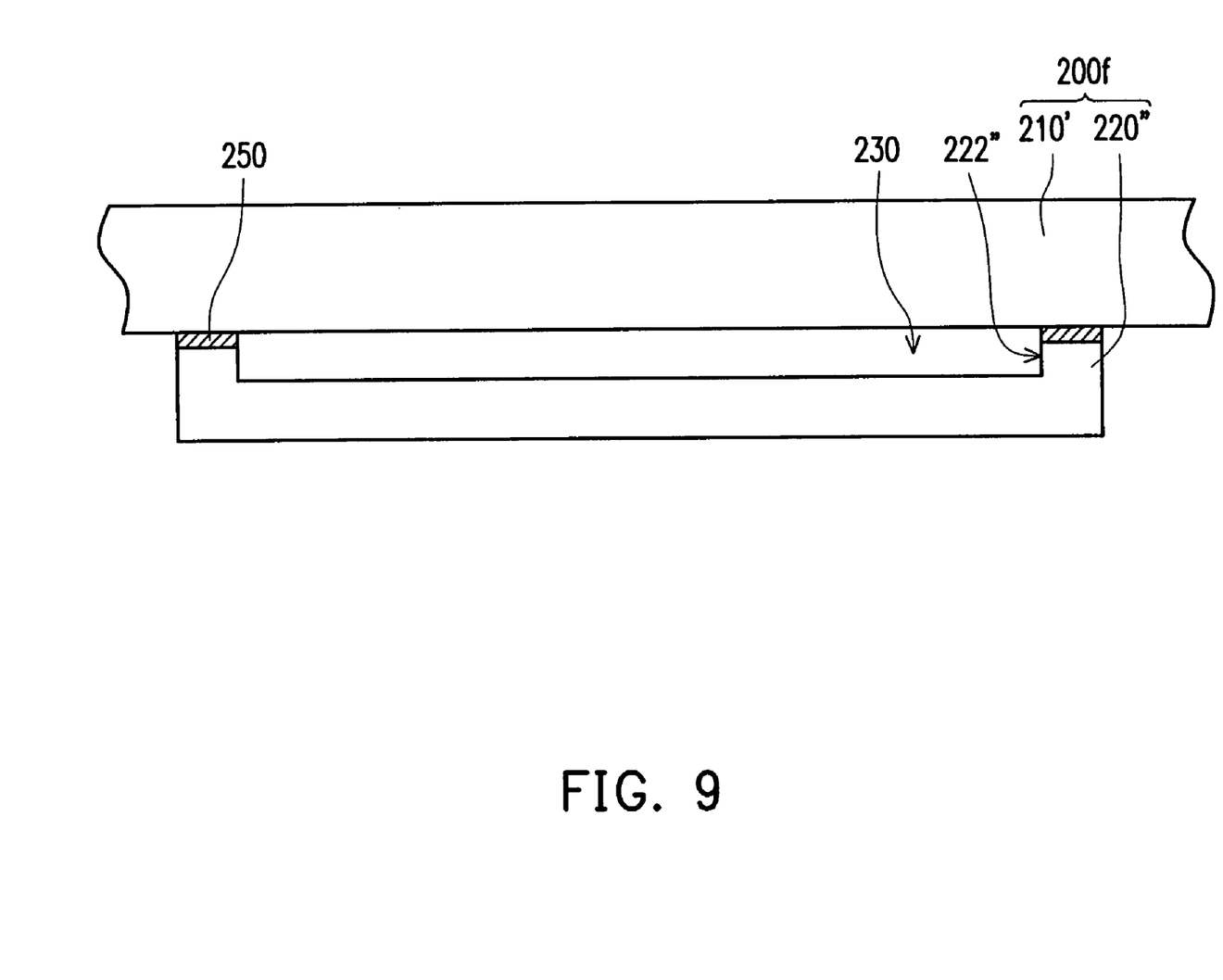
FIG. 9 is a partially magnified view of a housing according to a fourth embodiment of the present invention.

FIG. 9 is a partially magnified view of a housing according to a fourth embodiment of the present invention. In the present embodiment, the housing 200f mainly includes an outer casing 210' and a heat conductive element 220". The heat conductive element 220" has a second groove 222" formed thereon. Furthermore, the outer casing 210' covers the second groove 222" of the heat conductive element 220" to form an insulated chamber 230. Similar to the first embodiment, the housing 200f in the present embodiment may further include an adhesive 250 that joins the outer casing 210' and the heat conductive element 220" together.

Figure 10:
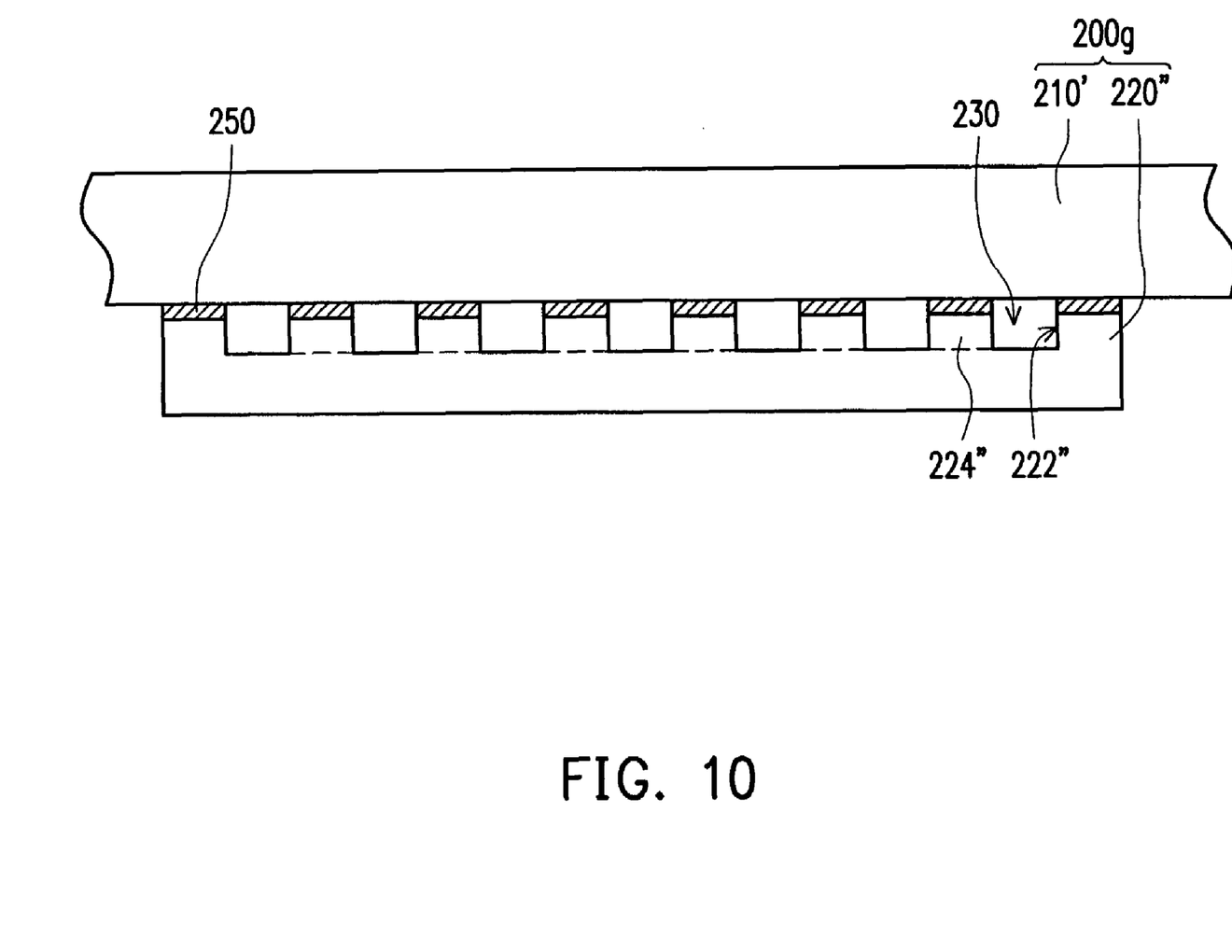
FIG. 10 is a partially magnified view of a housing according to a fifth embodiment of the present invention.

FIG. 10 is a partially magnified view of a housing according to a fifth embodiment of the present invention. In the present embodiment, the housing 200g mainly includes an outer casing 210' and a heat conductive element 220". The heat conductive element 220" has a second groove 222" formed thereon. Furthermore, the heat conductive element 220" has a plurality of second protrusions 224" formed inside the second groove 222". These second protrusions 224" are arranged in a matrix inside the second groove 222", for example. In the present embodiment, the second protrusions 224" are connected to the heat conductive element 220" through adhesives 250, for example. In addition, the adhesives 25 are made of a heat-resistant material to maintain proper adhesion even when the adhesives 250 are subjected to the heat from the heat source 240.

In the present embodiment, the second protrusions 224" have a design similar to the first protrusions 214. Hence, a detailed description is omitted.

The aforementioned insulated chamber inside the housing is a sealed chamber, for example. The insulated chamber may contain a thermal-insulating gas. In general, a gas having a high thermal insulating property such as air (having a thermal conductivity k=2.63×10$^{-2}$ W/m*K), lower thermal conductivity than that of the foam (having a thermal conductivity k=6.06×10$^{-2}$ W/m*K) or some other injected gas. Obviously, the insulated chamber of the present invention can be a vacuum chamber. In addition, the position of the insulated chamber in the housing as shown in the second to fifth embodiments of the present invention may be modified in a way similar to the first embodiment.

In summary, the housing in the present invention includes at least the following advantages:

1. The insulated chamber between the outer casing and the heat conductive element can effectively prevent the heat from a heat source from directly heating the outer casing.

2. Through the setup of protrusions inside the insulated chamber between the outer casing and the heat conductive element, the depth level of the insulated chamber can be maintained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A housing of a projection apparatus, the housing for enclosing a heat source of the projection apparatus, the housing comprising:
   an outer casing having an inner wall, a first groove and a plurality of first protrusions disposed inside the first groove, wherein the outer casing encloses the heat source; and
   a heat conductive element disposed on the inner wall between the outer casing and the heat source, wherein an insulated chamber is formed between the heat conductive element and the outer casing, the heat conductive element covers the first groove to form the insulated chamber, wherein the insulated chamber is a sealed chamber, and the first protrusions are located between the outer casing and the heat conductive element, and the first protrusions are connected to the heat conductive element.

2. The housing of claim 1, wherein the housing further includes a layer of adhesive adhered between the outer casing and the heat conductive element.

3. The housing of claim 1, wherein the height of each of the first protrusions and the depth of the first groove are the same.

4. The housing of claim 1, wherein the height of each of the first protrusions is set between 1 millimeter to 7 millimeter.

5. The housing of claim 1, wherein the heat source includes a light source and the heat conductive element has a reflecting surface for reflecting a light emitted from the light source.

6. The housing of claim 5, wherein the heat conductive element has a scattering surface facing the heat source.

7. The housing of claim 1, wherein the housing further includes a thermally insulating gas disposed inside the insulated chamber.

8. The housing of claim 7, wherein the insulating gas includes air.

9. The housing of claim 7, wherein the insulating gas includes a gas having a thermal conductivity lower than that of foam.

10. The housing of claim 1, wherein the insulated chamber includes a vacuum chamber.

11. The housing of claim 1, wherein the housing is a casing of a projection apparatus.

* * * * *